US011567196B2

(12) United States Patent
Taudien

(10) Patent No.: US 11,567,196 B2
(45) Date of Patent: Jan. 31, 2023

(54) EXPENDED RANGE TRACKING DOPPLER SONAR

(71) Applicant: Teledyne Instruments, Inc., Thousand Oaks, CA (US)

(72) Inventor: Jerker Taudien, State College, PA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 654 days.

(21) Appl. No.: 16/143,173

(22) Filed: Sep. 26, 2018

(65) Prior Publication Data
US 2021/0341600 A1 Nov. 4, 2021

Related U.S. Application Data

(60) Provisional application No. 62/670,552, filed on May 11, 2018, provisional application No. 62/625,883, filed on Feb. 2, 2018.

(51) Int. Cl.
*G01S 15/60* (2006.01)
*G01S 7/54* (2006.01)
(52) U.S. Cl.
CPC ............ *G01S 15/60* (2013.01); *G01S 7/54* (2013.01)
(58) Field of Classification Search
None
See application file for complete search history.

(56) References Cited

U.S. PATENT DOCUMENTS

| 4,914,639 A | 4/1990 | Lind |
| 5,077,700 A | 12/1991 | Shaw |
| 5,122,990 A | 6/1992 | Deines et al. |
| 5,315,562 A | 5/1994 | Bradley et al. |
| 5,445,156 A | 8/1995 | Daft et al. |
| 5,483,499 A | 1/1996 | Brumley et al. |
| 5,550,792 A | 8/1996 | Crandall |

(Continued)

FOREIGN PATENT DOCUMENTS

| CN | 101458331 | 6/2009 | |
| GB | 2430332 A | * 3/2007 | ........ H04M 1/72415 |

(Continued)

OTHER PUBLICATIONS

French office action dated Sep. 25, 2020 in patent application No. FR1901020.

(Continued)

*Primary Examiner* — Hovhannes Baghdasaryan
(74) *Attorney, Agent, or Firm* — Knobbe, Martens, Olson & Bear, LLP

(57) ABSTRACT

An underwater active sonar system and method for measuring instrument velocity with respect to a boundary surface is disclosed. The system includes an acoustic transducer configured to transmit and receive a plurality of acoustic beams in different directions. The system also includes a processor configured to detect a boundary surface within each beam; iteratively filter received acoustic signals backscattered from the transmitted beams with an adaptive filter and associated bandwidth that is successively decreased for each iteration; and measure instrument velocity with respect to the boundary surface.

27 Claims, 11 Drawing Sheets

(56) References Cited

U.S. PATENT DOCUMENTS

| | | | |
|---|---|---|---|
| 5,852,567 A * | 12/1998 | Xia | H04B 1/10 |
| | | | 708/400 |
| 5,923,617 A | 7/1999 | Thompson et al. | |
| 2002/0126577 A1 * | 9/2002 | Borchardt | G01S 15/87 |
| | | | 367/88 |
| 2008/0080314 A1 * | 4/2008 | Brumley | G01P 5/241 |
| | | | 367/89 |
| 2011/0182147 A1 | 7/2011 | Vogt | |
| 2012/0313900 A1 * | 12/2012 | Dahl | G06F 3/043 |
| | | | 345/177 |
| 2017/0031020 A1 | 2/2017 | Brumley et al. | |

FOREIGN PATENT DOCUMENTS

| | | |
|---|---|---|
| WO | WO 86/00145 | 1/1986 |
| WO | WO 97/47990 | 12/1997 |
| WO | WO 00/20893 | 4/2000 |
| WO | WO 08/039948 | 4/2008 |

OTHER PUBLICATIONS

Anderson, An introduction to multivariate statistical analysis, 3rd Edition, Jul. 2003, pp. 70-71, Wiley InterScience.

Berger, On the correlation coefficient of a bivariate, equal variance, complex Gaussian sample, The Annals of Mathematical Statistics, Dec. 1972, 43(6):2000-2003.

Braun et al., A physical mobile radio channel model, IEEE Transactions on Vehicular Technology, May 1991, 40(2):472-482.

Brumley et al., Performance of a broad-band acoustic Doppler current profiler, IEEE Journal of Oceanic Engineering, Oct. 1991, 16(4):402-407.

Cabrera et al., Development of a practical coherent acoustic Doppler current profiler, in OCEANS '87, Sep. 28, 1987, IEEE, pp. 93-97.

Dillon et al., On the distribution of velocity measurements from pulse-to-pulse coherent Doppler sonar, IEEE Journal of Oceanic Engineering, Oct. 2012, 37(4):613-625.

Goodman, Statistical analysis based on a certain multivariate complex Gaussian distribution (an introduction), The Annals of Mathematical Statistics, Mar. 1963, 34(1):152-177.

Hegrenæs et al., Validation of a new generation DVL for underwater vehicle navigation, in Autonomous Underwater Vehicles (AUV), 2016 IEEE/OES, Nov. 6, 2016, IEEE, pp. 342-348.

Kincaid, Optimum waveforms for correlation detection in the sonar environment: noise-limited conditions, The Journal of the Acoustical Society of America, Feb. 1968, 43(2):258-268.

Marsden et al., RiverRay ADCP: performance of a shallow water phased array ADCP, in Current, Waves and Turbulence Measurements (CWTM), 2011 IEEE/OES 10th, Mar. 20, 2011, IEEE, pp. 254-258.

Monakov, et al., Error analysis of pulse-pair estimates, IEEE Transactions on Aerospace and Electronic Systems, Jul. 2011, 47(3):2222-2230.

Papoulis et al., Probability, random variables and stochastic processes, 4th Edition, Jan. 2002, p. 190, McGraw-Hill Europe.

Parnum et al., High-frequency seafloor acoustic backscatter from coastal marine habitats of Australia, Australian Acoustical Society, Proceedings of Acoustics 2012—Fremantle, Nov. 21-23, 2012, Fremantle, Australia.

Pathfinder Doppler Velocity Log (DVL) Guide, 600 kHz, Teledyne RD Instruments, Inc., Jun. 2017.

Proakis et al., Digital communications, 5th Edition, Nov. 2007, p. 22, McGraw Hill Education.

Taudien et al., Quantifying long-term accuracy of sonar Doppler velocity logs, IEEE Journal of Oceanic Engineering, accepted Jul. 26, 2017, pp. 1-13.

Taudien et al., Quantifying long-term accuracy of sonar Doppler velocity logs, IEEE Journal of Oceanic Engineering, Jul. 12, 2018, 43(3):764-776.

Turin, The characteristic function of Hermitian quadratic forms in complex normal variables, Blometrika, Jun. 1960, 47(1/2):199-201.

Urick, Principles of underwater sound, 2nd Edition, Dec. 1975, p. 205, McGraw-Hill.

Whalen, Detection of signals in noise, 1st Edition, Jun. 1971, Academic Press, pp. 214-221.

Yang, et al., Multibeam sonar bottom detection using multiple subarrays, in OCEANS'97, MTS/IEEE Conference Proceedings, IEEE, Oct. 6, 1997, vol. 2, pp. 932-938.

Great Britain search report dated Jul. 26, 2019 in patent application No. GB1901342.4, 4 pp.

Great Britain search report dated Nov. 11, 2019 in patent application No. GB1901342.4, 2 pp.

Great Britain examination report dated Jan. 27, 2022 in Patent Application No. GB1901342.4, 3 pp.

Oppenheim, et al. "Discrete-Time Signal Processing," third edition, 2009, p. 35.

Lathi, "Signal Processing & Linear Systems," 2000, p. 573.

* cited by examiner

EXPENDED RANGE TRACKING DOPPLER SONAR

RELATED APPLICATIONS

This application claims priority to U.S. Provisional Application No. 62/625,883, filed on Feb. 2, 2018, entitled "VERY NARROW BROADBAND DOPPLER SONAR FOR HIGH ALTITUDE BOTTOM TRACK," and U.S. Provisional Application No. 62/670,552, filed on May 11, 2018, entitled CORRELATION DETECTION OF BOUNDARY-LAYERS IN SONAR APPLICATIONS WITH REPEATED CODES, each of which is incorporated herein by reference in its entirety.

BACKGROUND

Field

The disclosed technology relates to underwater acoustic measurement systems and, more particularly, to a Doppler sonar that extends the bottom tracking range.

Description of the Related Technology

Doppler sonars, including Doppler velocity logs (DVL) and acoustic Doppler current profilers (ADCP), measure the relative velocity between the instrument and a group of scatterers by transmitting acoustic pulses along multiple beams that point in different directions and measure the Doppler shift of the acoustic signal that is scattered back towards the instrument in each beam. The group of scatterers can consist of either suspended particles in the water column to measure currents or a boundary surface, for example the ocean floor, to measure velocity over ground. A common configuration 100 consists of four beams 120a, 120b, 120c and 120d from an instrument 110 separated in azimuth by 90° and elevated from vertical 140 by a common angle referred to as the Janus angle $\alpha_J$ 130, such as is shown in FIG. 1. Other configurations exist, such as a three-beam configuration.

The radial Doppler frequency measured by a beam is approximated by $$f_D = \frac{2v_r}{c} f_{tx}, \quad (1)$$

where $v_r$ is the radial velocity, $f_{tx}$ is the transmit frequency, and c is the speed of sound.

Narrowband and Broadband are two common types of Doppler sonars that are distinguished by the transmit sequences that they utilize. Narrowband Doppler sonars transmit a finite-duration sinusoid. A mathematical representation is given by $$s(t) = \begin{cases} A \cos \omega_c t & 0 \le t \le T_{tx} \\ 0 & \text{else} \end{cases}, \quad (2)$$

where A is the amplitude, $\omega_c$ is the angular carrier frequency, t is time, and $T_{tx}$ is the transmit duration. Broadband Doppler sonars, on the other hand, transmit a sequence of codes that are repeated $N_p$ times to form the full transmit sequence. The code usually consists of a chirped signal or phase-coded symbols. An example of the latter is given, for which a single code is comprised of L symbols of duration $T_s$. The complex baseband representation is $s_{bb}(t)$ and the bandpass equivalent signal is $$s(t) = \text{Re}(s_{bb}(t)e^{j\omega_c t}). \quad (3)$$

The baseband representation of the full transmit sequence can be written as a sum of the $N_p$ coded pulses $$s_{bb}(t) = \sum_{k=0}^{N_p-1} s_c(t - kLT_s), \quad (4)$$

where $s_c(t)$ is the continuous-time representation of a discrete-time code $x_c[n]$. A pulse-shaping filter may be used to generate the continuous-time representation of the code. For example, a rectangular pulse shaping filter generates $s_c(t)$ from $x_c[n]$ according to $$s_c(t) = \sum_{n=0}^{L-1} x_c[n] \, rect\left(\frac{t - \frac{T_s}{2} - nT_s}{T_s}\right). \quad (5)$$

An example of a maximum-length sequence code of length seven is $x_c[n]=[1, 1, 1, -1, 1, 1, -1]$, which is a commonly used code in phased-array DVLs. However, any type of code of any length and any other waveform may be used.

The maximum achievable bottom-tracking range of a DVL is determined by the sonar equation and the signal-to-noise ratio (SNR) threshold of the processing algorithm. The sonar equation predicts the ratio of the average signal power to the average noise power, at a given range, from the transmitted power level, transducer geometry and efficiency, acoustic frequency, environmental conditions, and noise level. The obvious approach to obtain long maximum range is to increase the signal power. Increasing transmit power is expensive from a power consumption standpoint and it is impractical to obtain sufficient gain in SNR to obtain a significant increase in maximum range. Further, cavitation and shock limit the maximum SNR that can be achieved by increasing the transmit power. For a given transducer geometry, efficiency, acoustic frequency, and environmental conditions, remaining strategies include reducing the noise power and improving the processing algorithm to operate at a lower SNR.

The range of narrowband DVLs is typically greater than that of broadband DVLs, because of the narrower bandwidth reducing the total noise power. However, the additional range comes at a cost of increased standard deviation and decreased bottom detection fidelity—both side effects of the unity time-bandwidth product. The disclosed development combines the extended range capability of narrowband with the lower standard deviation of broadband bottom track.

U.S. Pat. No. RE 35,535 discloses a broadband acoustic Doppler current profiler (ADCP). U.S. Pat. Nos. 5,315,562 and 5,422,860 each disclose aspects of correlation velocity logs. U.S. Pat. No. 5,808,967 discloses phased arrays. U.S. Pat. No. 7,542,374 discloses for phased arrays a method of removing substantially a bias related to the velocity component orthogonal to the face. U.S. Pat. No. 7,839,720 discloses use of coding to remove sidelobe coupling bias in phased array systems. U.S. Pat. No. 5,923,617 discloses blazed arrays. Each of the patents in this paragraph are incorporated herein by reference in their entirety.

SUMMARY OF CERTAIN INVENTIVE ASPECTS

In one aspect, there is an underwater active sonar system for measuring instrument velocity with respect to a boundary surface, the system comprising an acoustic transducer configured to transmit and receive a plurality of acoustic beams in different directions; and a processor configured to: detect a boundary surface within each transmitted beam; iteratively filter received acoustic signals backscattered from the transmitted beams with an adaptive filter and associated bandwidth that is successively decreased for each iteration; and measure instrument velocity with respect to the boundary surface.

The processor may be further configured to detect a boundary surface within each beam by finding a peak response in a correlation coefficient signal. The system may additionally comprise a transmitter module configured to transmit a phase coded sequence comprising repeating codes of alternating sign. The processor may be further configured to beamform so as to separate the received acoustic signals. The processor may be further configured to measure vehicle velocity by backscattering sound off the bottom surface of a water body. The acoustic transducer may transmit one or more repetitions of a phase-coded or chirped signal to produce a wideband signal. The acoustic transducer may comprise at least one of a phased array, an array of phased arrays, a multichannel array, a blazed array, an array of blazed arrays, and a set of piston transducers.

In another aspect, there is an underwater active sonar system for measuring instrument velocity with respect to a boundary surface, the system comprising an acoustic transducer configured to transmit and receive a plurality of acoustic beams in different directions; and a processor configured to: detect a boundary surface within each transmitted beam by finding a peak response in a correlation coefficient signal; and measure instrument velocity with respect to the boundary surface.

The processor may be further configured to iteratively filter received acoustic signals backscattered from the transmitted beams with a filter and associated bandwidth that may be successively decreased for each iteration. The system may additionally comprise a transmitter module configured to transmit a phase coded sequence comprising repeating codes of alternating sign. The processor may be further configured to beamform so as to separate the received acoustic signals. The processor may be further configured to measure vehicle velocity by backscattering sound off the bottom surface of a water body. The acoustic transducer may transmit one or more repetitions of a phase-coded or chirped signal to produce a wideband signal. The acoustic transducer may comprise at least one of a phased array, an array of phased arrays, a multichannel array, a blazed array, an array of blazed arrays, and a set of piston transducers.

In another aspect, there is an underwater active sonar system for measuring instrument velocity with respect to a boundary surface, the system comprising an acoustic transducer configured to transmit and receive a plurality of acoustic beams in different directions; a transmitter module that transmits a phase coded sequence comprising repeating codes of alternating sign; and a processor configured to: detect a boundary surface within each transmitted beam; and measure instrument velocity with respect to the boundary surface.

The processor may be further configured to iteratively filter received acoustic signals backscattered from the transmitted beams with a filter and associated bandwidth that may be successively decreased for each iteration. The processor may be further configured to detect a boundary surface within each beam by finding a peak response in a correlation coefficient signal. The processor may be further configured to beamform so as to separate the received acoustic signals. The processor may be further configured to measure vehicle velocity by backscattering sound off the bottom surface of a water body. The acoustic transducer may transmit one or more repetitions of the phase-coded sequence or a chirped signal to produce a wideband signal. The acoustic transducer may comprise at least one of a phased array, an array of phased arrays, a multichannel array, a blazed array, an array of blazed arrays, and a set of piston transducers.

In yet another aspect, there is a method of measuring instrument velocity with respect to a boundary surface using an underwater active sonar system, the method comprising transmitting and receiving a plurality of acoustic beams in different directions; detecting a boundary surface within each transmitted beam; iteratively filtering received acoustic signals backscattered from the transmitted beams and associated bandwidth that is successively decreased for each iteration; and measuring instrument velocity with respect to the boundary surface.

The transmitting and receiving the beams in different directions may be from at least one of a phased array, an array of phased arrays, a multichannel array, a blazed array, an array of blazed arrays, and a set of piston transducers. The method may additionally comprise detecting a boundary surface within each beam by finding a peak response in a correlation coefficient signal. Measuring instrument velocity may include estimating a Doppler shift for each beam from segments of signals corresponding to the boundary surface, and computing the instrument velocity from the Doppler shift.

DETAILED DESCRIPTION OF CERTAIN ILLUSTRATIVE EMBODIMENTS

Figure 1:
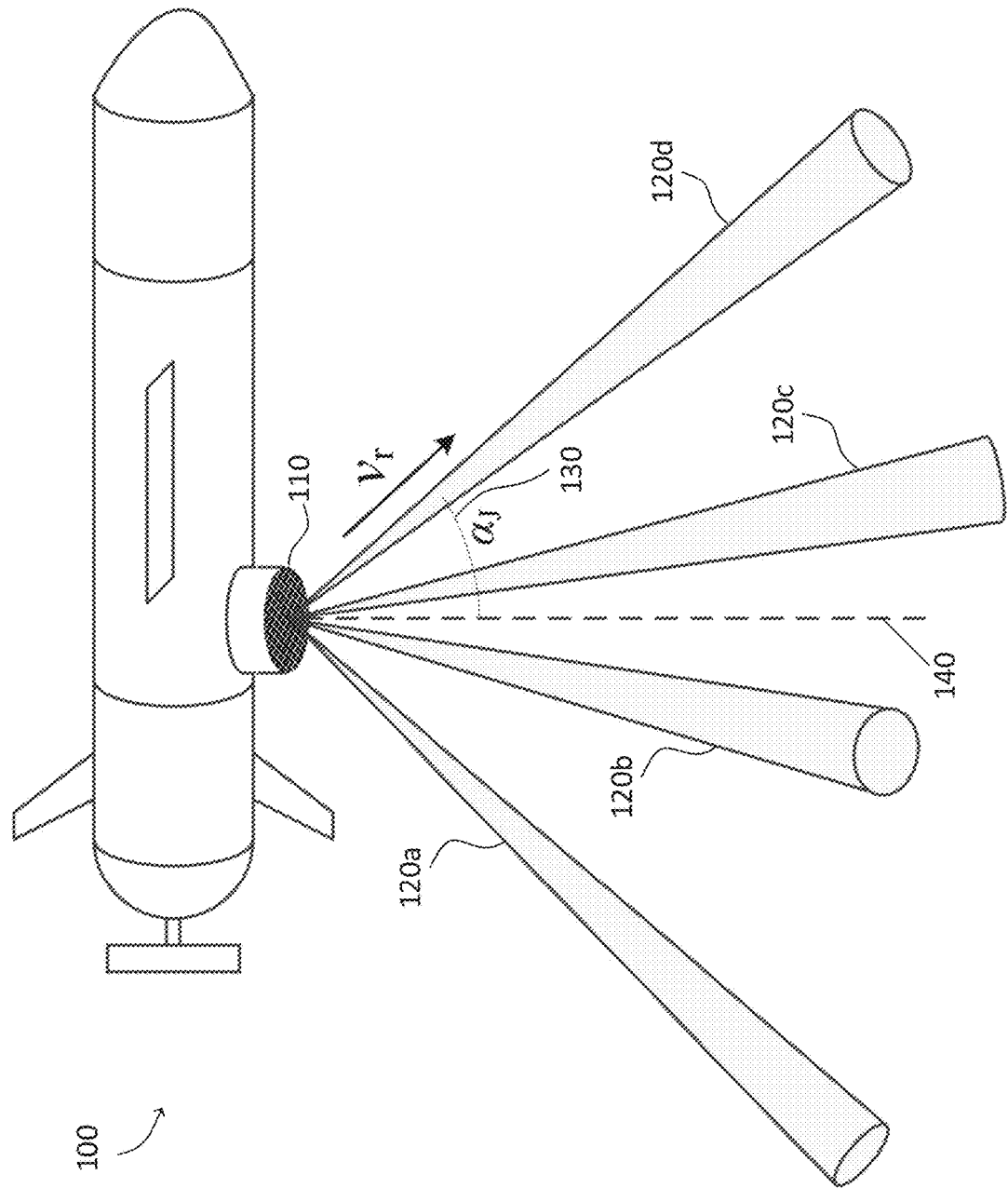
FIG. 1 is a diagram of an example Doppler sonar transmitting four beams in a Janus configuration.
Figure 2:
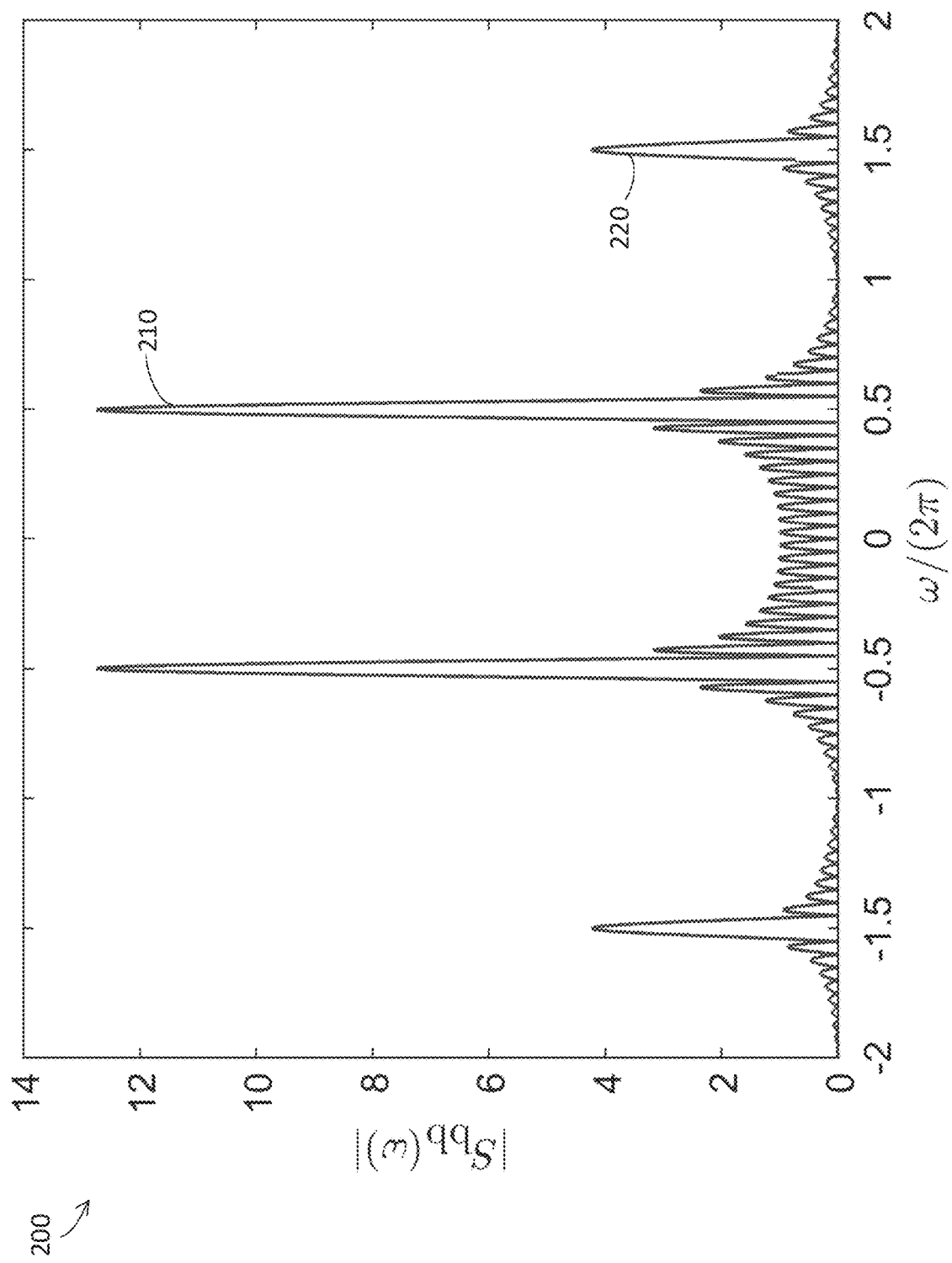
FIG. 2 is an example plot of the baseband spectrum of $s_{bb}(t)$ for frequencies in the range of $[-2, 2]$ Hz and length two code.

The motivation for the extended range tracking Doppler sonar is to operate at a range similar to a narrowband DVL, but without sacrificing standard deviation and bottom detection performance. The first inventive step consists of a transmit sequence, which is composed of repeated binary phase shift keying codes. Typically, maximum-length sequences are used for bottom track, but instead a length-two code $x_c[n]=[1, -1]$ is used in certain embodiments. This code choice allows for a longer symbol duration and correspondingly narrow bandwidth, for a given radial ambiguity velocity $U_a$, defined as $$U_a = \frac{c}{4f_c LT_s}, \tag{6}$$

where $f_c$ is the carrier frequency. A spectrum 200 of $s_{bb}(t)$ in equation 4 is shown in FIG. 2 for the length-two code, $T_s=1$ s, and $N_p=10$ for frequencies in the range [−2, 2] Hz. The spectrum consists of narrow peaks 210, 220, repeated with period 1 Hz and continues indefinitely with increasing frequency, but with progressively decreasing power. The strongest spectral peaks are located at frequencies $f=\pm R_s/2=\pm 1/(2T_s)$, where $R_s$ is the symbol rate.

Figure 3:
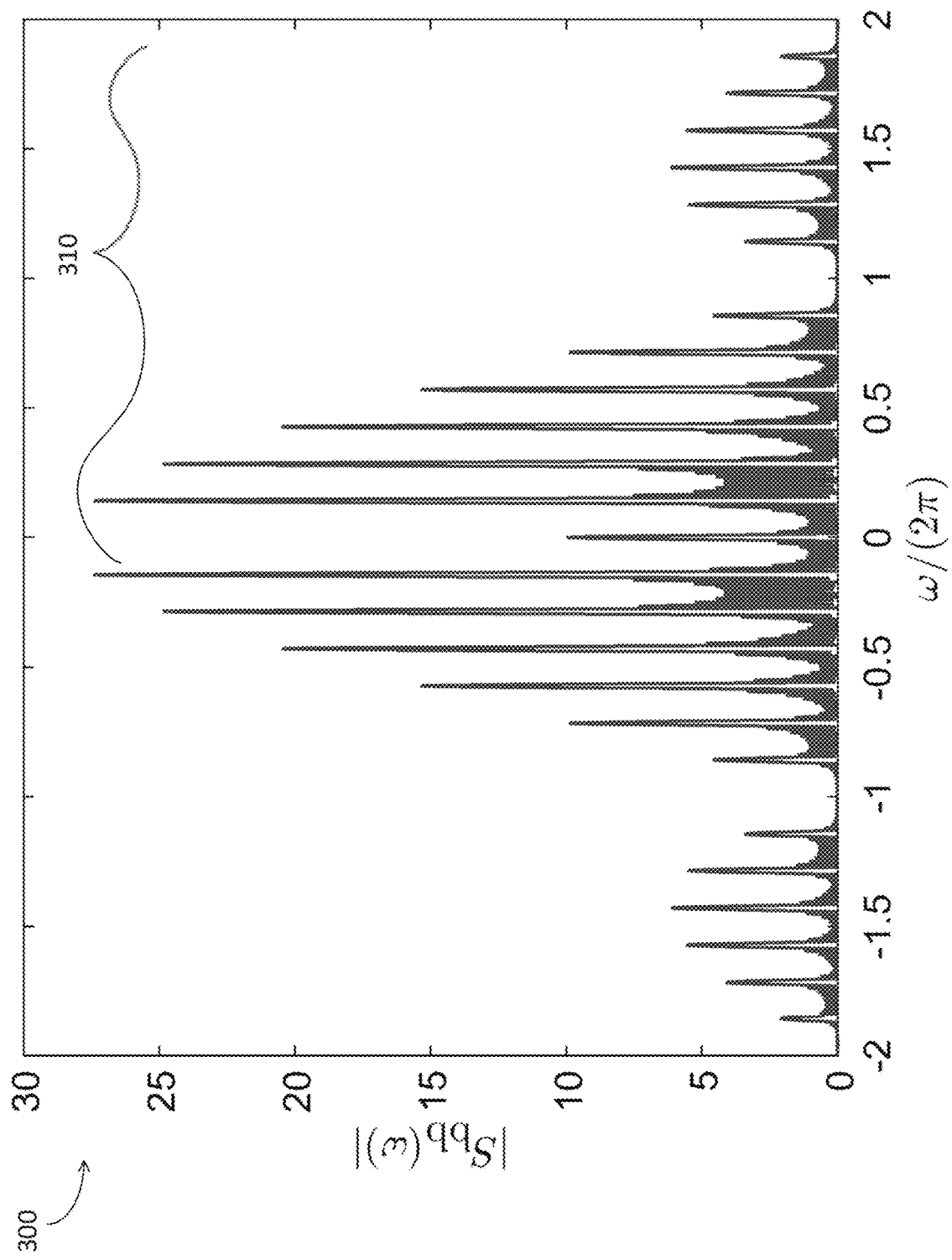
FIG. 3 is an example plot of the baseband spectrum of $s_{bb}(t)$ for frequencies in the range of $[-2, 2]$ Hz and the sequence of length seven.

A spectrum 300 of $s_{bb}(t)$ in equation 4 for the conventional maximum-length sequence of length seven contains thirteen peaks 310 within the two nulls, located at $f=\pm R_s$, as is shown in FIG. 3. Similarly, the spectrum of $s_{bb}(t)$ for narrowband signaling, as defined in equation 2, only contains one spectral peak located at f=0 Hz for zero Doppler shift.

Phased-array DVLs typically use a maximum-length sequence of length seven. Therefore, for constant ambiguity velocity $U_a$, the symbol duration can be increased by a factor of 3.5 compared to a code of length seven, leading to a decreased noise bandwidth and increased SNR by a factor of 3.5.

The disclosed development is not limited to any particular type of transducer technology and can be combined with phased-array transducers, piston transducers, blazed arrays, or any other type of transducer. The disclosed development is not limited to utilize codes consisting of two code elements, but can operate with other code lengths too.

The noise bandwidth can be decreased further by utilizing an adaptive narrowband filter with passbands centered at the spectral peaks. The filtering can be performed in an adaptive and iterative fashion with a progressively refined estimate of the Doppler shift and progressively reduced bandwidth of the passbands for each iteration, since the Doppler shift is typically not known a priori. The length-two code is advantageous over the length seven code for long-range application when the SNR is low, since the total bandwidth in the two spectral peaks is less than the total bandwidth in the thirteen spectral peaks corresponding to the code of length seven.

The length-two code can be advantageous over narrowband signaling because narrowband signaling is susceptible to amplitude fades, leading to a high variation in SNR for each ping. For a scattering medium with a large number of scatterers, the amplitude is Rayleigh distributed, according to $$f(x) = \frac{x}{\sigma^2} e^{-\frac{x^2}{2\sigma^2}}, x \geq 0. \tag{7}$$

Therefore, the amplitude of unfavorable narrowband pings is often much lower than the average amplitude. For example, the probability of a 6-dB fade of a narrowband ping is 17.8%. A low amplitude reduces the probability of detection and also increases the variance of the estimation error—both undesirable properties. Broadband signaling, on the other hand, contributes to multiple uncorrelated amplitude samples per ping, leading to a lower variation of the root-mean-square amplitude over pings, reduces fading, and improves detection and estimation.

Those skilled in the art should now realize that there is a tradeoff between total noise power and variation of the amplitude, for which the variable is code length. The length-two code provides sufficient improvement in the amplitude variation, at the expense of a factor of two increase in noise power compared to narrowband signaling. Compared to longer codes, such as the maximum-length sequences of length seven, the length-two code provides much reduced noise power at a modest expense of amplitude variation. The reasoning is not limited to codes of length two, but could be extended to other codes that provide a different tradeoff between noise power and average amplitude variation.

Figure 4:
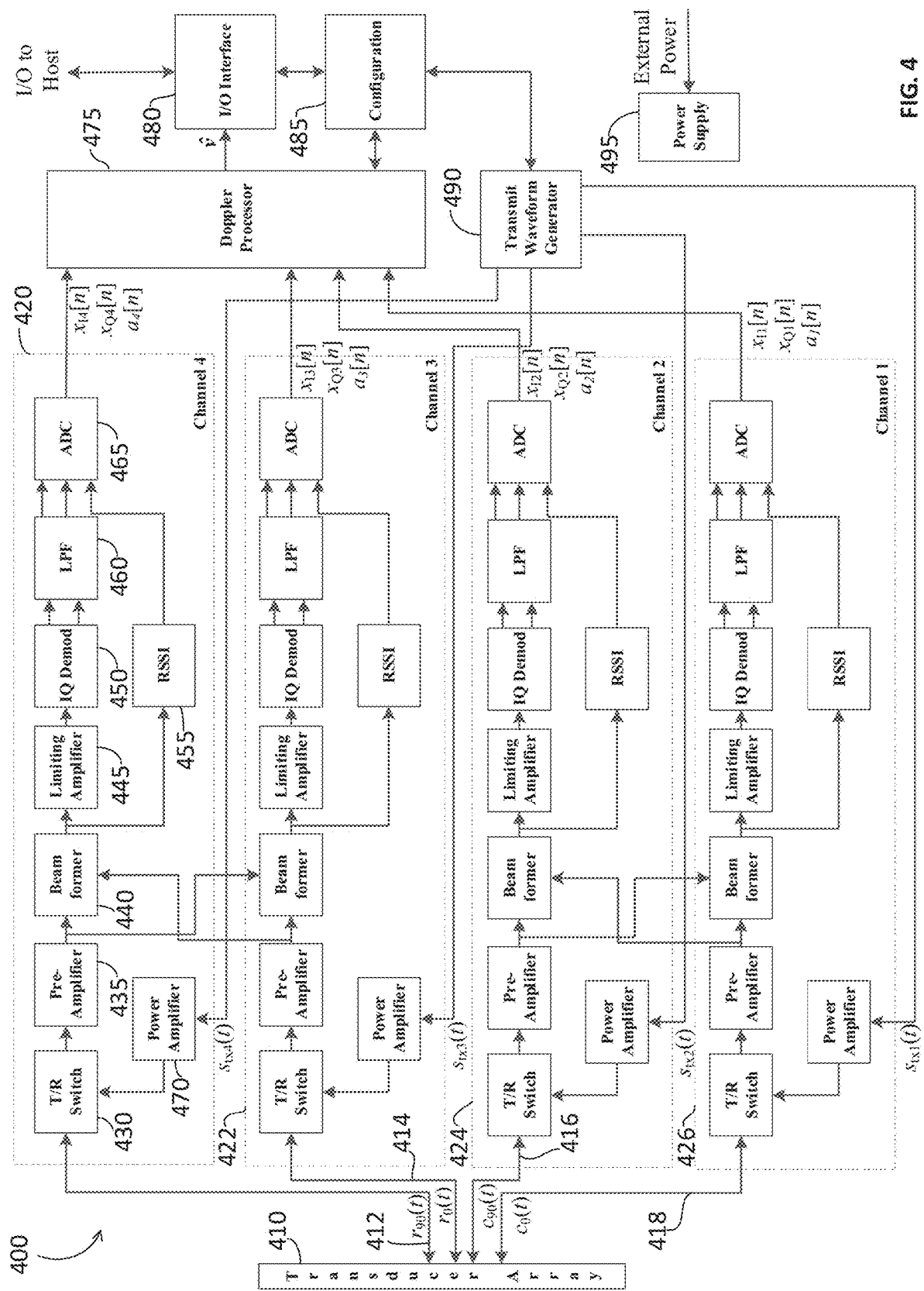
FIG. 4 is a diagram of an example Doppler sonar having an amplitude signal path and a phase signal path.

Doppler sonars 400 often contain two separate signal paths: amplitude and phase. The phase signal is limited, filtered and digitized and the amplitude signal is mapped to a logarithmic function as shown in FIG. 4. This partitioning is beneficial to suppress the large dynamic range otherwise required in the receiver circuitry. Conventional bottom-detection schemes, such as the method described by Deines and Maier in U.S. Pat. No. 5,122,990, utilize the logarithmic amplitude signal to detect the bottom. Those methods work well with high-to-moderate SNR, but the performance may be reduced in low-SNR environments.

Figure 5:
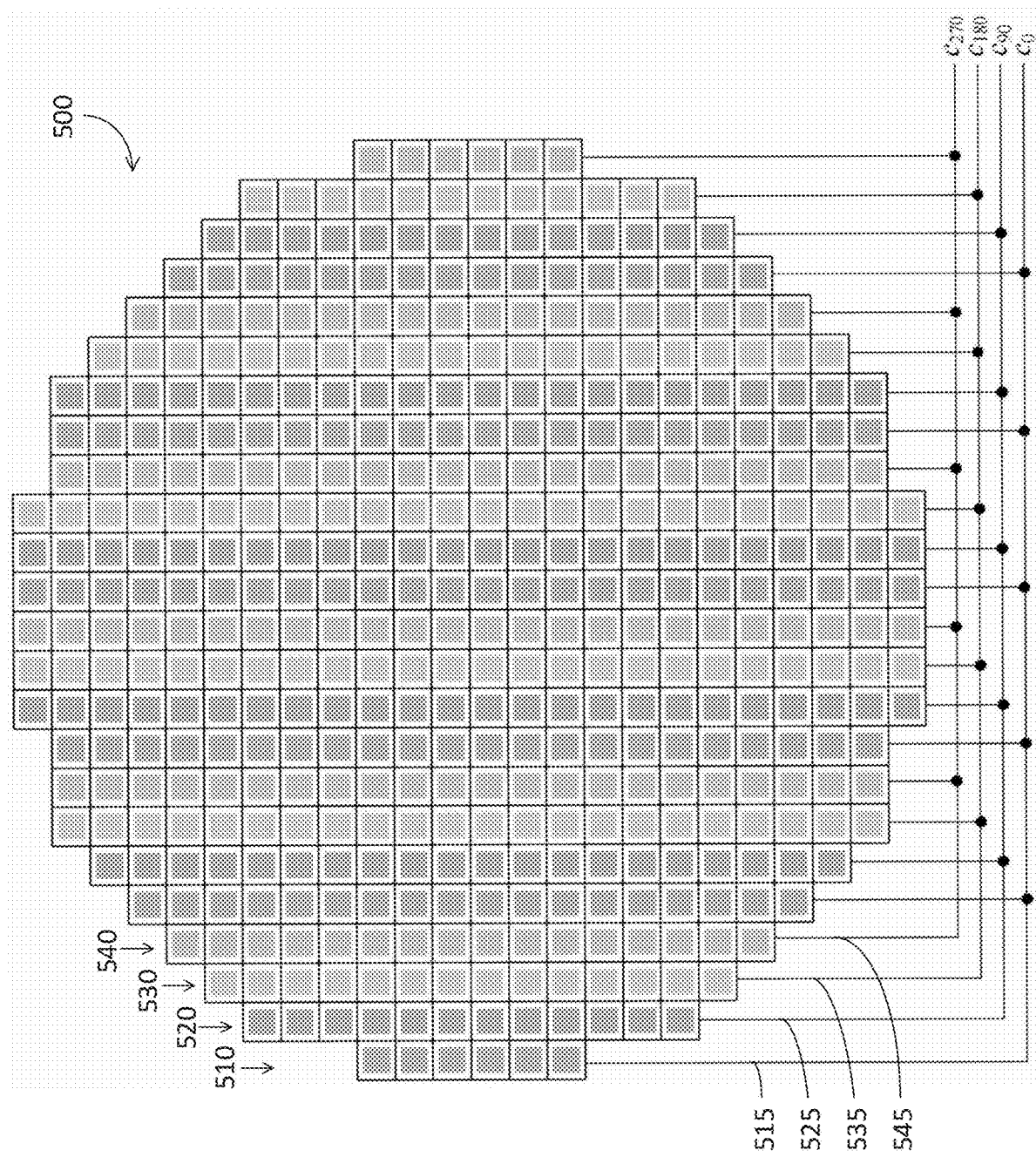
FIG. 5 is a diagram of an example of a phased-array transducer for a Doppler velocity log (DVL).

A block diagram of a portion of a typical phased-array DVL is shown in FIG. 5. A single example phased-array transducer 500 is used both as a projector and hydrophone and connects to the electronics through four signals: $c_0(t)$, $c_{90}(t)$, $r_0(t)$, and $r_{90}(t)$ (respectively, 418, 416, 414 and 412 in FIG. 4), where r and c represent rows and columns, respectively. The column signals are shown in FIG. 5, where each unique column signal is connected to every four columns of one side of the piezoelectric transducer. For example, a column 510 corresponds to column signal 515, which connects to five other columns. Similarly column 520 corresponds to column signal 525, column 530 corresponds to column signal 535 and column 540 corresponds to column signal 545. The differential pairs $c_0$-$c_{180}$ and $c_{90}$-$c_{270}$ are combined to single-ended signals through transformers, and the two output signals are named $c_0$ and $c_{90}$. Similarly, the opposite side of the piezoelectric transducer consists of the row signals (not shown) that are also combined to single-ended signals through transformers. The same naming convention is adhered to for the row signals, where the two outputs are named $r_0$ and $r_{90}$. Further, the array is sliced along the two dimensions that are rotated by 90° to create the rows and columns according to some spacing that may be fixed or variable, but a common choice is to set the spacing to one half of the acoustic wavelength corresponding to some nominal speed of sound.

Referring again to FIG. 4, a transducer array or acoustic transducer 410 and four channels are shown, where in this example, channel one 426 corresponds with signal $c_0(t)$ 418, channel two 424 corresponds with signal $c_{90}(t)$ 416, channel three 422 corresponds with signal $r_0(t)$ 414 and channel four 420 corresponds with signal $r_{90}(t)$ 412. In certain embodiments, the acoustic transducer can be at least one of a phased array, an array of phased arrays, a multichannel array, a blazed array, an array of blazed arrays, and a set of piston transducers. The transmit signals, $s_{tx1}(t)$-$s_{tx4}(t)$, are created by the transmit waveform generator 490 and amplified by power amplifiers 470. The transmit/receive switches 430 multiplex between the transmit signals when transmitting and the receive signals when receiving. In receive mode, the signals from the transducer 410 are amplified by a preamplifier 435, designed with low noise characteristics in mind. Beamforming 440 is performed by adding the 0° and 90° signals with a relative phase shift equal to 90° for beams 1 and 3 and −90° for beams 2 and 4. The beamformer output is split into two paths: IQ and amplitude. The IQ path consists of an amplitude-limiting amplifier 445, a zero-IF demodulator 450, and an anti-aliasing lowpass filter 460 and digitization by an analog-to-digital converter (ADC) 465. The amplitude path consists of a received signal strength indicator (RSSI) block 455 that measures signal strength logarithmically and digitization by the ADC 465. The amplitude-limiting amplifier 445 in the IQ path is used to suppress the dynamic range of the input, stemming from the large variation in SNR. This particular partitioning of the system 400 is just one example of an embodiment. Other partitions and arrangements could be created to implement the same functionality as the disclosed embodiment.

The Doppler processor 475 in FIG. 4 performs the task of computing the Doppler shift and the associated instrument velocity. The instrument velocity is provided to I/O interface 480 that can provide input and output to a host. The I/O interface 480 is also connected to a configuration block 485, which is also connected to Doppler processor 475 so as to provide configuration information. Configuration block 485 is also in communication with the transmit waveform generator 490 for configuration information. System 400 also includes a power supply 495, which can be connected to an external power source.

Figure 6:
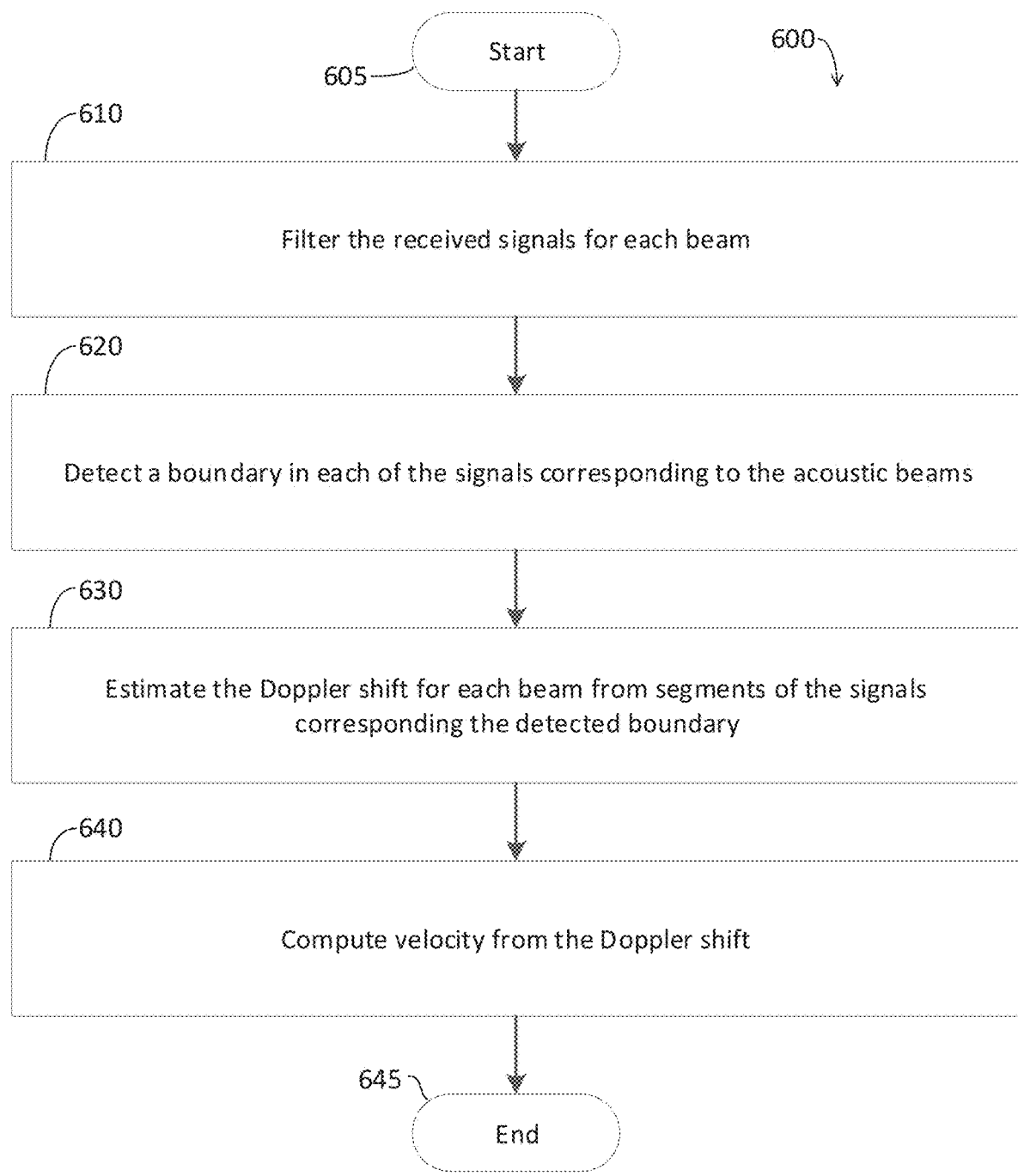
FIG. 6 is an example flowchart of a process for measuring velocity according to an embodiment of the Doppler sonar shown in FIG. 4.

FIG. 6 is a flowchart of a process or method 600 for measuring velocity according to an embodiment of the disclosed technology. Each of the steps can be performed by the Doppler processor as illustrated in FIG. 4. In the description of the embodiment projection is presumed to be set up with a transmitted pulse that is composed of a multitude of sequences repeated at a time interval $T_L$. Further, it is assumed that Janus beams are created either by a multitude of piston transducers or by beamforming of phased-array signals or some other means.

Step 1. After a start 605, in block 610, method 600 filters the received signals for each beam according to some desired filter shape and bandwidth. The filter shape and bandwidth should be chosen to accommodate the spectrum of the received signals including any Doppler shifts.

Step 2. In block 620, method 600 locates a boundary or multiple boundaries, such as the seafloor, surface or ice sheets, for each beam and selects the data segments to be used. Using signal intensity, signal power, correlation coefficient, or covariance, method 600 determines suitable segments to be used for Doppler estimation in each beam. Detection of a boundary can be performed by finding the maximum value, a local peak, a certain shape, a peak at the output of a filter matched to a certain shape, or some other metric. Depending on the application, a different type of boundary may be desirable for detection, or multiple boundaries may be detected.

Step 3. In block 630, method 600 estimates the Doppler shift for each beam from segments corresponding to the detected boundaries. The covariance method is used to compute the Doppler phase $\theta_D$ according to $$c[n] = \frac{1}{N} \sum_{m=n}^{n+N-1} x^*[m]x[m + LN_{SPE}], \text{ and} \tag{8}$$

$$\theta_D = \angle c[n], \tag{9}$$

where $x[m]=x_I[m]+jx_Q[m]$ is the received complex digitized signal for each beam, * denotes complex conjugation, N is the number of samples averaged over, and $N_{SPE}$ is the number of samples per code element.

Step 4. In block 640, method 600 computes the radial velocity for each beam from the Doppler shift, which is accomplished through $$v_r = \frac{U_a}{\pi}\theta_D. \tag{10}$$

An instrument or earth frame velocity may also be computed by transforming the radial velocities to an instrument-frame coordinate system or a coordinate systems aligned with earth. Method 600 completes at an end 645.

Figure 7:
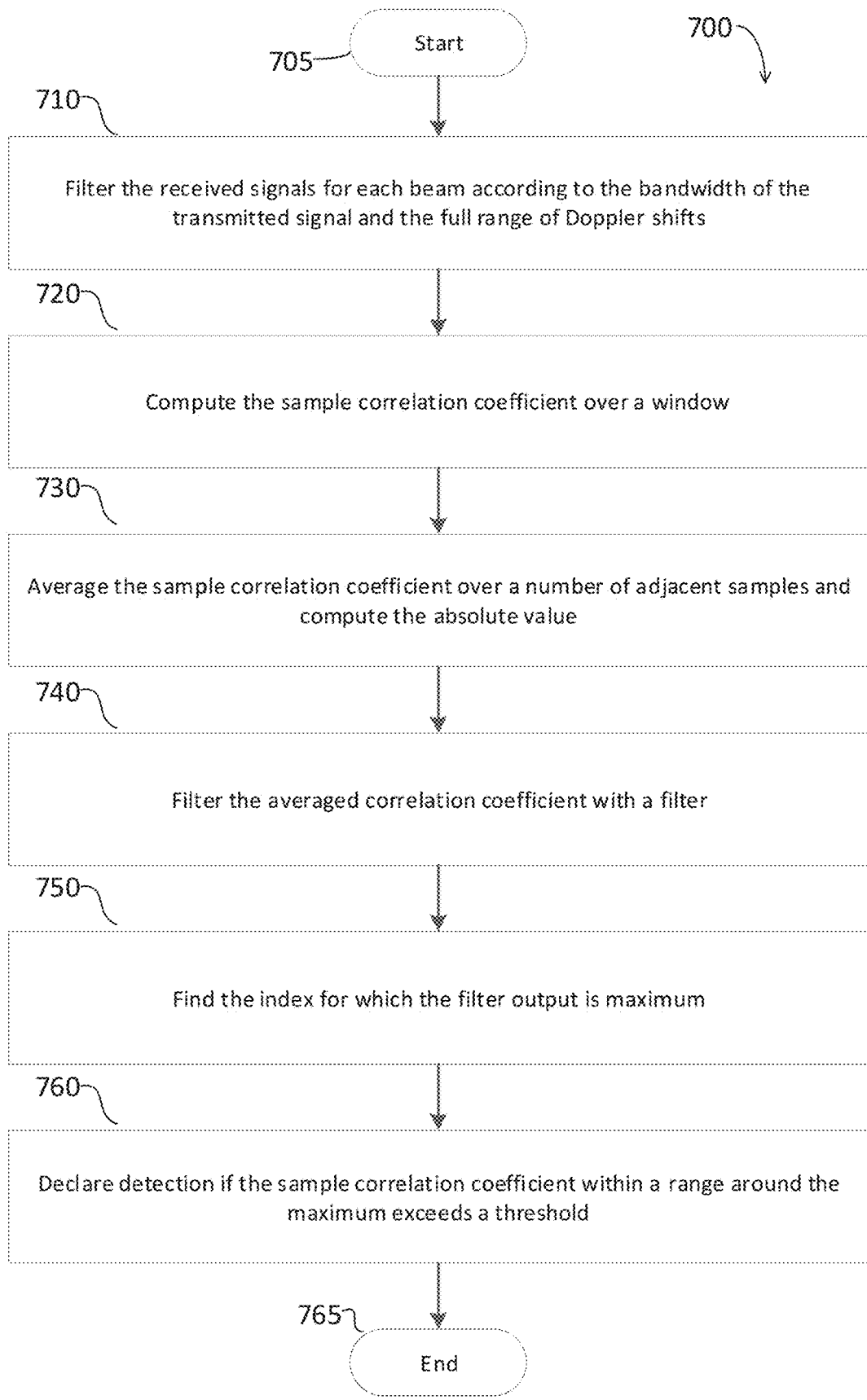
FIG. 7 is an example flowchart of a process for boundary detection according to an embodiment of the Doppler sonar shown in FIG. 4.

FIG. 7 is a flowchart of a process or method 700 for boundary detection according to an embodiment of the disclosed technology. Each of the steps can be performed by the Doppler processor as illustrated in FIG. 4. In the description of the embodiment it is assumed that projection is set up with a transmitted pulse that is composed of a multitude of sequences repeated at a time interval $T_L$. Further, it is assumed that Janus beams are created either by a multitude of piston transducers or by beamforming of phased-array signals or some other means. The steps in the flowchart in FIG. 7 correspond to one beam, but are performed for each beam independently.

Figure 8:
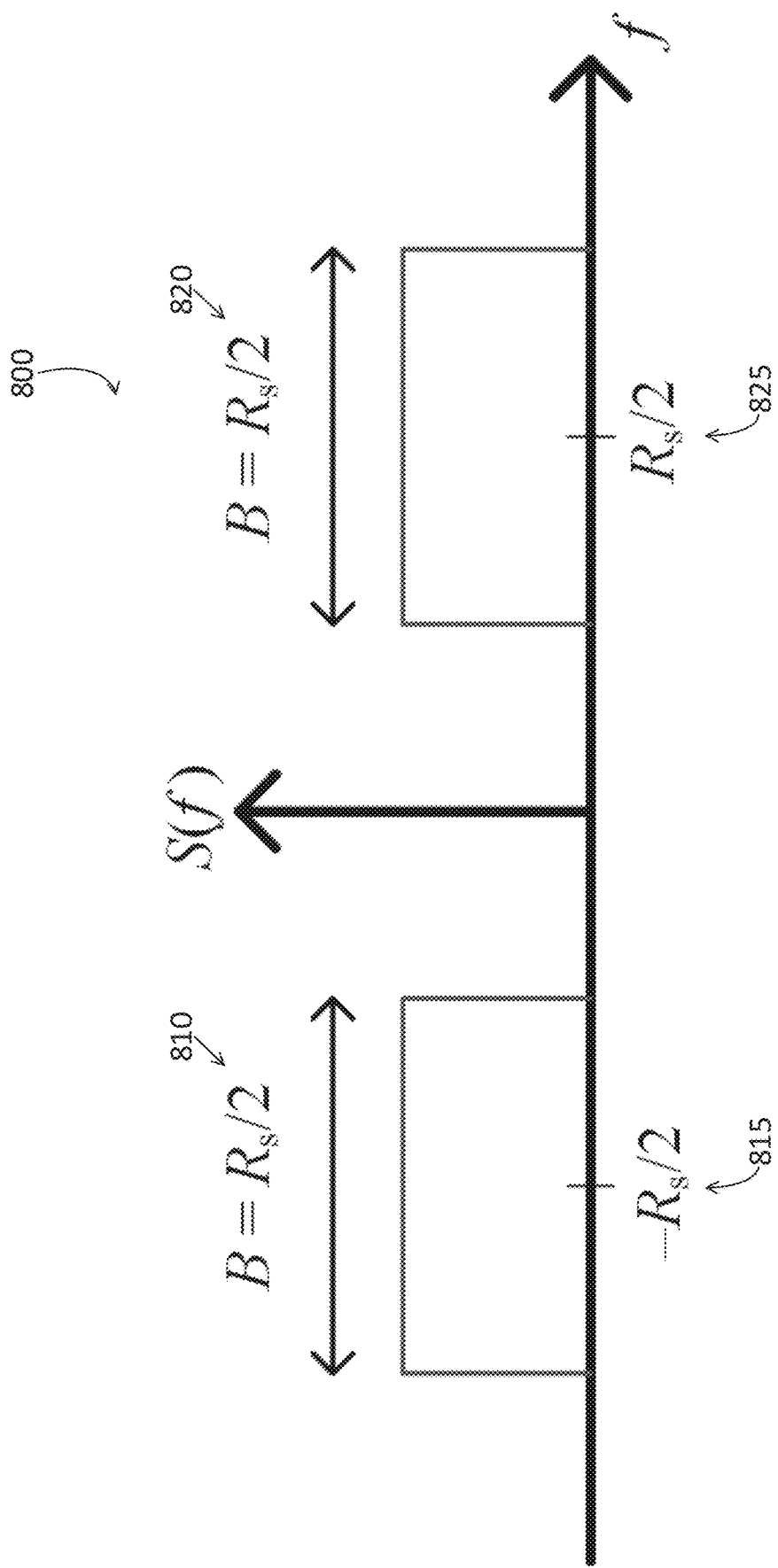
FIG. 8 is an example plot of spectrum versus frequency illustrating two passbands centered at two spectral peaks of highest power.

Step 1. After a start 705, in block 710, method 700 filters the received signals according to some desired filter shape and bandwidth. The filter shape and bandwidth should be chosen to accommodate the spectrum of the received signals including any Doppler shifts. An advantage of the length two code is that the carrier is suppressed, allowing for filtering 800 the received signal according to FIG. 8, which contains two passbands 810 and 820 centered at the two spectral peaks of highest power 815 and 825, respectively. This filtering technique further reduces the noise power seen by the Doppler processor, by reducing the noise bandwidth.

Step 2. In block 720, method 700 computes the sample correlation coefficient over a window of length W samples according to $$r[k] = \frac{\sum_{n=k}^{k+W-1} x^*[n]x[n + LN_{SPE}]}{\sum_{n=k}^{k+W-1} |x[n]|^2}, \tag{11}$$

for k=[1, W, 2W, ..., (N−1)W]. Variations of the equation to compute the sample correlation coefficient exist and the particular version shown in equation 11 should not limit the scope of the embodiment.

Step 3. In block 730, method 700 averages the sample correlation coefficient over M adjacent samples of r[k] and computes the absolute value. The averaging can be implemented by a filter of length M, in which the tap weights are 1/M The advantage of steps 2 and 3 is to trade off the required computational complexity for resolution in $r_a[k]$, the absolute value of the averaged sample correlation coefficient. The choice of W sets the resolution and for Doppler sonar applications it can be set coarsely, since the purpose of boundary detection is to determine a segment of a signal to compute the Doppler shift within as opposed to very precisely measuring range to the boundary.

Step 4. In block 740, method 700 filters the absolute value of the averaged sample correlation coefficient $r_a[k]$ with a filter tuned to the expected shape of a boundary echo within $r_a[k]$. It is typical to select W and M such that the product WM corresponds to the transmit duration $T_{tx}=LN_pT_s$. The expected shaped $r_a[k]$ is then a triangle and the filter of choice is a triangle with duration equal to the transmit duration.

Step 5. In block 750, method 700 searches for the maximum value of the output of the filter in step 4. The sample corresponding to the maximum is assigned to $k_{max}$.

Step 6. In block 760, method 700 determines if the sample correlation coefficient around the index corresponding to the maximum value exceeds a detection threshold D. More specifically, detection is declared if $r_a[k]$ exceeds D for at least one sample k in the range $k_{max}-M \le k \le k_{max}+M$. The value of the sample correlation coefficient is within the range $0 \le r_a[k] \le 1$. Therefore, the detection threshold D should also lie within that range. A specific value of D is chosen to tradeoff between the false-detection rate and the missed detection rate. Method 700 completes at an end 765.

In certain embodiments, the method shown in FIG. 7 only searches for one boundary within the signal, but can be modified to find multiple boundaries by searching for multiple local maxima. Further, the method is only one implementation of boundary detection. Those skilled in the art of boundary detection will understand that boundary detection can be accomplished by modifying the method in a number of ways. For example, the code length could be changed; power, amplitude, covariance, or some other function could be used instead of the sample correlation coefficient; and any or all filters could be tuned differently.

Figure 9:
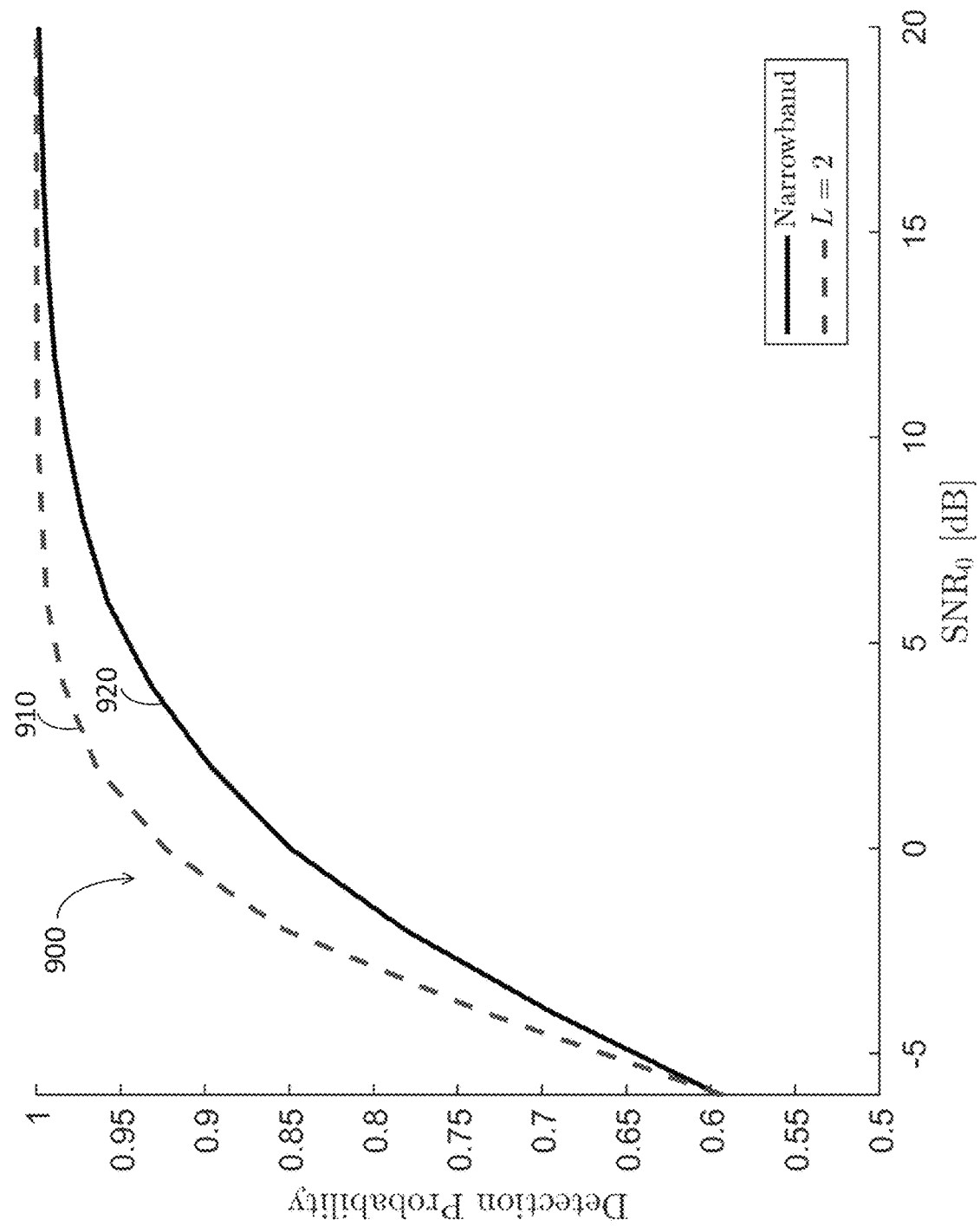
FIG. 9 is an example diagram showing a simulated detection probability as a function of signal-to-noise ratio, normalized to the narrowband embodiment in comparison with the length-2 embodiment.

FIG. 9 is a diagram showing the simulated detection probability 900 as a function of SNR, normalized to the narrowband case to provide for a fair comparison. The noise power in the simulation for the L=2 case 910 is twice that of the narrowband case 920 for all data points to account for the dual spectral peaks. For this particular case, the number of code elements is set to one hundred. It is evident that the L=2 case 910 performs much better than the narrowband case 920. In particular the detection probability approaches unity with increasing SNR rather quickly. However, the slope of the detection curve for the narrowband case is flatter and requires much higher SNR to approach unity detection probability. Intuitively, this is due to amplitude fading, as discussed earlier in this specification. Hence, the length-2 code has an advantage over narrowband signaling due to the higher fidelity detection-probability performance.

Figure 10:
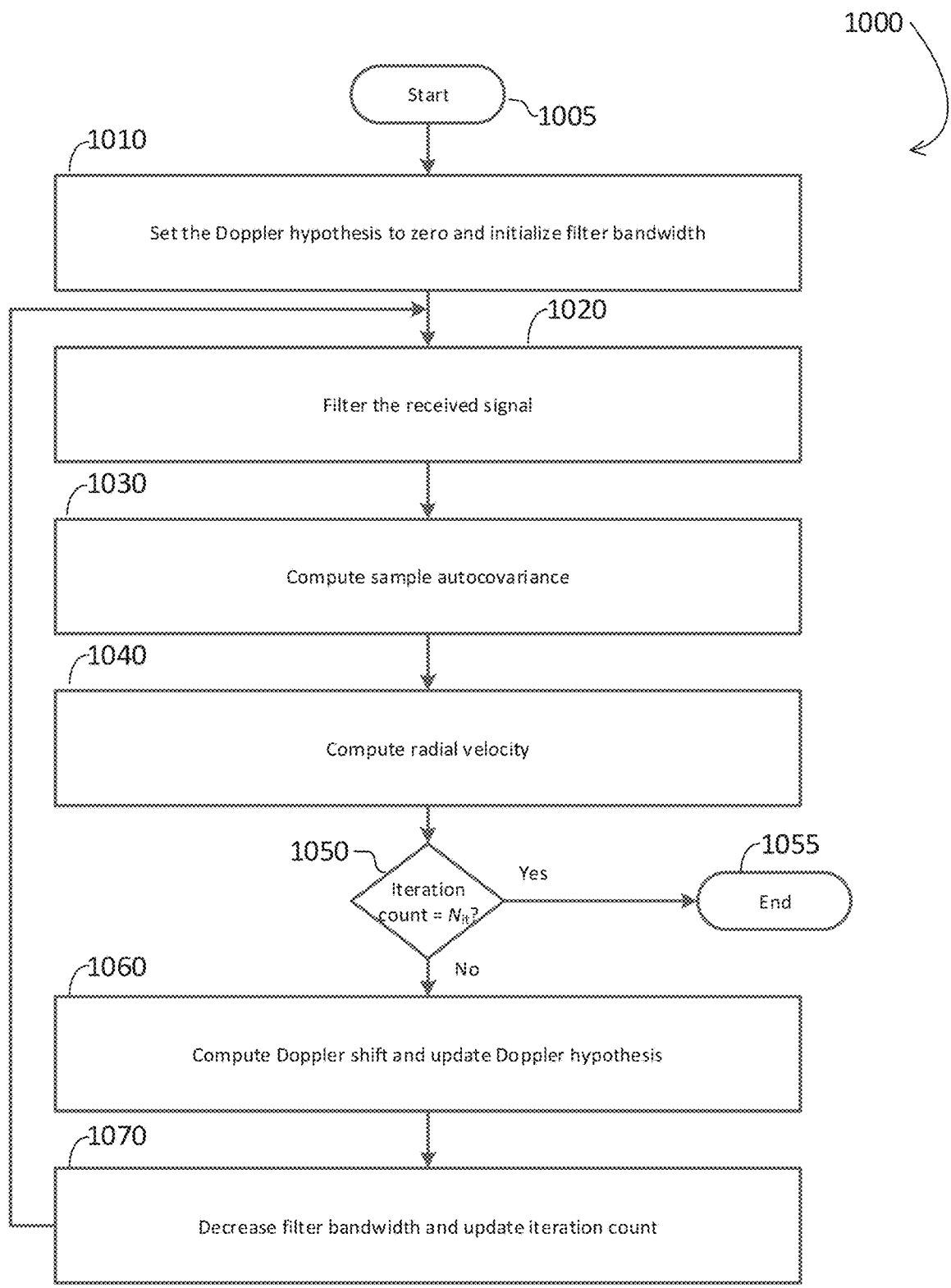
FIG. 10 is an example flowchart of a process for velocity estimation according to an embodiment of the Doppler sonar shown in FIG. 4.

FIG. 10 is a flowchart of a process or method 1000 for velocity estimation according to an embodiment of the disclosed technology. Each of the steps can be performed by the Doppler processor as illustrated in FIG. 4. In the description of the embodiment it is assumed that projection is set up with a transmitted pulse that is composed of a multitude of sequences repeated at a time interval $T_L$. Further, it is assumed that Janus beams are created either by a multitude of piston transducers or by beamforming of phased-array signals or some other means. The steps in the flowchart in FIG. 10 correspond to one beam, but are performed for each beam independently.

Step 1. After a start 1005, in block 1010, method 1000 initializes the Doppler hypothesis to zero and initializes the filter bandwidth to a value that accommodates a range of Doppler shifts. Typically the bandwidth is set to accommodate Doppler shifts limited to an ambiguity velocity $U_a$, i.e., bandwidth $B=R_s/2$. An iteration counter is set to $n_{it}=1$.

Step 2. In block 1020, method 1000 filters the received signals according to some desired filter shape and bandwidth. The filter could consist of a comb filter, multiple bandpass filters, multiple lowpass filters in combination with frequency translation, or any other method to filter out the noise between the spectral peaks. An example of the lowpass filters in combination with frequency translation is now outlined. Down convert x[n] by multiplying by complex exponential, $y_+[n]=x[n]e^{-j\Omega_p n}$ and upconvert x[n] by complex exponential, $y_-[n]=x[n]e^{-j\Omega_n n}$. The discrete-time frequencies $\Omega_p$ and $\Omega_n$ are computed from $$\Omega_p = \frac{2\pi}{f_s}\left(f_D + \frac{f_c}{LN_{CPE}}\right) \text{ and} \tag{12}$$

$$\Omega_n = \frac{2\pi}{f_s}\left(f_D - \frac{f_c}{LN_{CPE}}\right), \tag{13}$$

where $f_s$ is the sampling rate and $N_{CPE}$ is the number of carrier cycles per code element. Filter the down converted and up converted signals with a Butterworth filter of bandwidth B, i.e., $$z_+[n]=y_+[n]*h[n] \text{ and} \tag{14}$$

$$z_-[n]=y_-[n]*h[n], \tag{15}$$

where the symbol * indicates convolution and h[n] is the filter impulse response. Those skilled in the art will recognize that filtering can be implemented using convolution, using a difference equation, in the frequency domain, or using some other method. The last step of filtering is to remodulate and add the two components according to $$z[n]=z_+[n]e^{j\Omega_p n}+z_-[n]e^{j\Omega_n n}. \tag{16}$$

The bandwidth of the filter is reduced iteratively. This filtering technique reduces the noise power seen by the Doppler processor, by reducing the noise bandwidth.

Step 3. In block 1030, method 1000 computes the sample autocovariance over a segment consisting of $W_v$ samples that was previously determined by the boundary detection algorithm to correspond to a boundary echo centered at sample $n_1$ according to $$c[n_1] = \sum_{n=n_1-\frac{W_v}{2}}^{n_1+\frac{W_v}{2}} x^*[n]x[n+LN_{SPE}]. \tag{17}$$

Step 4. In block 1040, method 1000 computes the radial velocity according to $$v_r = \frac{U_a}{\pi} Lc[n_1].  \quad (18)$$

Step 5. In block 1050, method 1000 determines if the iteration counter is equal to the total number of iterations $N_{it}$. If the iteration counter is equal to $N_{it}$, then the loop terminates at an end 1055 and the current radial velocity estimate is taken as the final estimate. If the iteration counter is less than $N_{it}$, then the loop continues.

Step 6. In block 1060, method 1000 computes the Doppler shift according to equation 1. The Doppler hypothesis is updated with the Doppler shift computed in block 1060 and will be used during the following block in method 1000.

Step 7. In block 1070, method 1000 updates the iteration counter, $n_{it}=n_{it}+1$ and decreases the bandwidth, B=B/2. In this particular implementation of the velocity processing routine, the bandwidth is decreased by a factor of two each iteration. Other ratios or factors could also be used. Further, it may be desirable to set the bandwidth to a fixed value after completing a number of iteration with decreasing bandwidth to ensure convergence. After completing the operations in block 1070, method 1000 returns to block 1020 to continue the loop.

Figure 11:
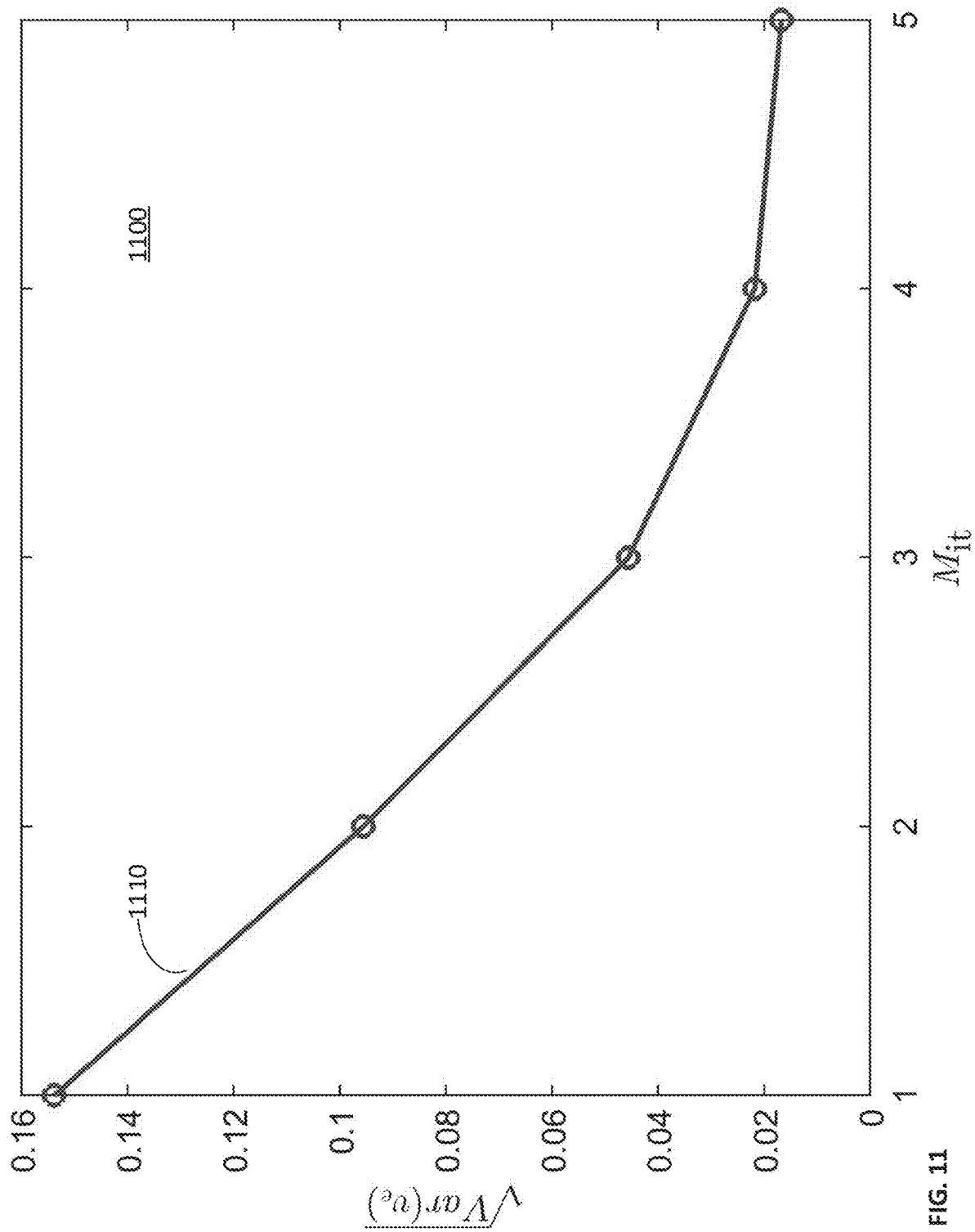
FIG. 11 is an example plot of a standard deviation of the estimate error versus a number of iterations for a DVL operating at 150-m altitude.

The iterative filtering method in FIG. 10 reduces the noise power by reducing the bandwidth. Reduced noise power leads to an improved velocity estimate, i.e., reduces the variance of the error between the actual velocity and estimated velocity. In FIG. 11, the standard deviation of the estimate error 1100 is graphed 1110 versus number of iterations for a 600-kHz Teledyne RDI Pathfinder DVL operating at 150-m altitude. In this example, after the first iteration, the standard deviation is exceeding 15 cm/s and after 5 iterations the standard deviation is less than 2 cm/s. The iterative filtering method does indeed improve the velocity estimation greatly. In comparison, to obtain the same improvement in standard deviation, averaging of $(15/2)^2 \approx 56$ pings is required. Hence, the iterative filtering method is providing a significant advantage over conventional Doppler sonar technology.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, rather than sequentially.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

What is claimed is:

1. An underwater active sonar system for measuring instrument velocity with respect to a boundary surface, the system comprising:
   an acoustic transducer configured to transmit and receive a plurality of acoustic beams in different directions, wherein the plurality of acoustic beams comprises multiple beams with a common Janus angle; and
   a processor configured to:
      detect a boundary surface within each transmitted beam;
      iteratively filter received acoustic signals backscattered from the transmitted beams with an adaptive filter and associated bandwidth that is successively decreased for each iteration, wherein the adaptive filter is configured to at least perform convolution by an impulse response or implement a difference equation, and wherein the adaptive filter tracks a Doppler shift for each transmitted beam; and
      measure instrument velocity with respect to the boundary surface.

2. The system of claim 1, wherein the processor is further configured to detect a boundary surface within each beam by finding a peak response in a correlation coefficient signal.

3. The system of claim 1, additionally comprising a transmitter module configured to transmit a phase coded sequence comprising repeating codes of alternating sign.

4. The system of claim 1, wherein the processor is further configured to beamform so as to separate the received acoustic signals.

5. The system of claim 1, wherein the processor is further configured to measure vehicle velocity by backscattering sound off the bottom surface of a water body.

6. The system of claim 1, wherein the acoustic transducer transmits one or more repetitions of a phase-coded or chirped signal to produce a wideband signal.

7. The system of claim 1, wherein the acoustic transducer comprises at least one of a phased array, an array of phased arrays, a multichannel array, a blazed array, and an array of blazed arrays.

8. An underwater active sonar system for measuring instrument velocity with respect to a boundary surface, the system comprising:
   an acoustic transducer configured to transmit and receive a plurality of acoustic beams in different directions; and
   a processor configured to:
      locate a boundary surface within each transmitted beam by finding a peak response in a correlation coefficient signal;
      estimate a Doppler shift for each of the transmitted beams from segments of signals corresponding to location of the boundary surface; and
      compute instrument velocity with respect to the boundary surface based on the Doppler shift.

9. The system of claim 8, wherein the processor is further configured to iteratively filter received acoustic signals backscattered from the transmitted beams with a filter and associated bandwidth that is successively decreased for each iteration.

10. The system of claim 8, additionally comprising a transmitter module configured to transmit a phase coded sequence comprising repeating codes of alternating sign.

11. The system of claim 8, wherein the processor is further configured to beamform so as to separate the received acoustic signals.

12. The system of claim 8, wherein the processor is further configured to measure vehicle velocity by backscattering sound off the bottom surface of a water body.

13. The system of claim 8, wherein the acoustic transducer transmits one or more repetitions of a phase-coded or chirped signal to produce a wideband signal.

14. The system of claim 8, wherein the acoustic transducer comprises at least one of a phased array, an array of phased arrays, a multichannel array, a blazed array, and an array of blazed arrays.

15. An underwater active sonar system for measuring instrument velocity with respect to a boundary surface, the system comprising:
   an acoustic transducer configured to transmit and receive a plurality of acoustic beams in different directions;
   a transmitter module that transmits a phase coded sequence comprising repeating phase shift keying codes of length two, wherein each of the codes of length two has two code elements of opposite sign; and
   a processor configured to:
      detect a boundary surface within each transmitted beam; and
      measure instrument velocity with respect to the boundary surface.

16. The system of claim 15, wherein the processor is further configured to iteratively filter received acoustic signals backscattered from the transmitted beams with a filter and associated bandwidth that is successively decreased for each iteration.

17. The system of claim 15, wherein the processor is further configured to detect a boundary surface within each beam by finding a peak response in a correlation coefficient signal.

18. The system of claim 15, wherein the processor is further configured to beamform so as to separate the received acoustic signals.

19. The system of claim 15, wherein the processor is further configured to measure vehicle velocity by backscattering sound off the bottom surface of a water body.

20. The system of claim 15, wherein the acoustic transducer transmits one or more repetitions of the phase-coded sequence or a chirped signal to produce a wideband signal.

21. The system of claim 15, wherein the acoustic transducer comprises at least one of a phased array, an array of phased arrays, a multichannel array, a blazed array, and an array of blazed arrays.

22. A method of measuring instrument velocity with respect to a boundary surface using an underwater active sonar system, the method comprising:
   transmitting and receiving a plurality of acoustic beams in different directions wherein the plurality of acoustic beams comprises multiple beams with a common Janus angle;
   detecting a boundary surface within each transmitted beam;
   iteratively filtering received acoustic signals backscattered from the transmitted beams and associated bandwidth that is successively decreased for each iteration, wherein iteratively filtering is performed using convolution by an impulse response or using a difference equation, and wherein iteratively filtering includes tracking a Doppler shift for each transmitted beam; and
   measuring instrument velocity with respect to the boundary surface.

23. The method of claim 22, wherein the transmitting and receiving the beams in different directions is from at least one of a phased array, an array of phased arrays, a multi-channel array, a blazed array, and an array of blazed arrays.

24. The method of claim 22, additionally comprising detecting a boundary surface within each beam by finding a peak response in a correlation coefficient signal.

25. The method of claim 22, wherein measuring instrument velocity includes estimating a Doppler shift for each beam from segments of signals corresponding to the boundary surface, and computing the instrument velocity from the Doppler shift.

26. The system of claim 1, wherein the adaptive filter is configured to track a progressively refined estimate of a Doppler shift for each beam from segments of signals corresponding to detected boundaries.

27. The system of claim 26, wherein measuring instrument velocity includes computing the instrument velocity from the Doppler shift.

* * * * *